(12) United States Patent
Chaudhry et al.

(10) Patent No.: US 12,298,950 B1
(45) Date of Patent: May 13, 2025

(54) CENTRALIZED DATA PLATFORM FOR DISPARATE APPLICATIONS

(71) Applicant: IP Holdings 2017 LLC, New York, NY (US)

(72) Inventors: Muhammad Saljook Asghar Chaudhry, Woodbridge, VA (US); Fabio Luzzi, Brooklyn, NY (US)

(73) Assignee: IP Holdings 2017 LLC, New York, NY (US)

( * ) Notice: Subject to any disclaimer, the term of this patent is extended or adjusted under 35 U.S.C. 154(b) by 0 days.

(21) Appl. No.: 18/736,165

(22) Filed: Jun. 6, 2024

(51) Int. Cl.
  *G06F 16/00* (2019.01)
  *G06F 16/215* (2019.01)
  *G06F 16/2455* (2019.01)

(52) U.S. Cl.
  CPC ...... *G06F 16/215* (2019.01); *G06F 16/24564* (2019.01)

(58) Field of Classification Search
  CPC .......................... G06F 16/215; G06F 16/24564
  See application file for complete search history.

(56) References Cited

U.S. PATENT DOCUMENTS

| | | | |
|---|---|---|---|
| 7,257,581 B1 | 8/2007 | Steele et al. | |
| 8,135,747 B2 | 3/2012 | Anzalone et al. | |
| 8,887,197 B2 | 11/2014 | Fengg et al. | |
| 9,201,981 B2 | 12/2015 | Anzalone et al. | |
| 10,467,636 B2 | 11/2019 | Gopal et al. | |
| 10,580,022 B2 | 3/2020 | L'huillier et al. | |
| 10,866,584 B2 | 12/2020 | Cella et al. | |
| 11,004,096 B2 | 5/2021 | Thomas et al. | |
| 11,048,725 B2* | 6/2021 | Schukovets | G06F 16/2282 |
| 11,210,271 B1* | 12/2021 | Vishnoi | G06F 11/0772 |
| 11,354,747 B2 | 6/2022 | Magdelinic | |
| 11,366,455 B2 | 6/2022 | Cella et al. | |

(Continued)

FOREIGN PATENT DOCUMENTS

| | | |
|---|---|---|
| CN | 111708740 A | 9/2020 |
| CN | 116663664 A | 8/2023 |

(Continued)

*Primary Examiner* — Noosha Arjomandi
(74) *Attorney, Agent, or Firm* — Bryan Cave Leighton Paisner LLP (57) ABSTRACT

A computer-implemented method that includes executing a data lake application that includes computing instructions operable to perform operations including receiving raw data, cleansing the raw data using validation rules to generate curated raw data, and storing the curated raw data. The method also can include executing an OLAP application that includes computing instructions operable to perform operations including building a data layer comprising transaction objects from the curated raw data, storing the data layer in a data store, and performing batch processing using the data layer. The method additionally can include executing an OLTP application that includes computing instructions operable to perform operations including performing real-time processing based on data received from one or more of the curated raw data or the data layer. Communications to and from the data lake application, the OLAP application, and the OLTP application with other applications are processed through a unified data exchange. Other embodiments are described.

20 Claims, 4 Drawing Sheets

(56) References Cited

U.S. PATENT DOCUMENTS

| | | |
|---|---|---|
| 11,551,300 B2 | 1/2023 | Koziol et al. |
| 2014/0032506 A1* | 1/2014 | Hoey .................... G06F 16/215 |
| | | 707/691 |
| 2014/0358845 A1 | 12/2014 | Mundlapundi et al. |
| 2015/0363711 A1* | 12/2015 | Raman ................ G06Q 10/063 |
| | | 705/7.11 |
| 2016/0283573 A1* | 9/2016 | Werner ............... G06F 16/2379 |
| 2020/0117676 A1* | 4/2020 | Ben Moshe .......... G06F 16/254 |
| 2022/0036302 A1* | 2/2022 | Cella ...................... G06N 20/00 |
| 2022/0343432 A1 | 10/2022 | Magdelinic |
| 2022/0365945 A1* | 11/2022 | Yuan ......................... G06F 7/08 |
| 2023/0062655 A1* | 3/2023 | Wan ...................... G06F 16/254 |
| 2023/0306025 A1* | 9/2023 | Raghavan ............. G06F 16/256 |
| 2024/0160611 A1* | 5/2024 | Shafiulla ............... G06F 16/258 |

FOREIGN PATENT DOCUMENTS

| | | |
|---|---|---|
| EP | 4264533 A2 | 10/2023 |
| JP | 2002149946 A | 5/2002 |
| KR | 102192335 B1 | 12/2020 |
| WO | 2022271141 A1 | 12/2022 |
| WO | 2023097026 A2 | 6/2023 |

* cited by examiner

410 – Executing a data lake application

411 – Receiving raw data

412 – Cleansing the raw data to generate curated data

413 – Storing the curated data in a data lake

420 – Executing an OLAP application

421 – Building a data layer from the curated raw data

422 – Storing the data layer in a data store

423 – Performing batch processing using the data layer

430 – Executing an OLTP application

431 – Performing real-time processing

440 – Repopulating data for one application that is inaccessible

450 – Accessing a subset of data stored in a regional data platform

FIG. 4

CENTRALIZED DATA PLATFORM FOR DISPARATE APPLICATIONS

TECHNICAL FIELD

This disclosure generally relates to data management systems, and more specifically, to a centralized data platform that seamlessly integrates various data functions for disparate applications within an enterprise.

BACKGROUND

In the realm of data management, a variety of systems and applications are used to handle, process, and store data. These systems can include data lakes, online analytical processing (OLAP) systems, and online transaction processing (OLTP) systems. A data lake is a system or repository of data stored in its natural/raw format, which can allow for the storage of large amounts of raw data in a scalable and cost-effective manner. OLAP involves data stored in a database, typically through batch processing. OLTP supports transaction-oriented applications and is typically characterized by a large number of short online transactions (e.g., insert, update, delete), with fast query processing. Conventionally, these functions operate in separate systems, with separate interfaces.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds, for example.

DESCRIPTION OF EXAMPLES OF EMBODIMENTS

In some embodiments, a centralized data platform is designed to seamlessly integrate various data functions within an enterprise. The centralized data platform can serve as a data hub, connecting different types of data uses and simplifying tasks such as online and offline data processing. This approach can facilitate data-driven decision-making and supports a wide range of applications within a company. The centralized data platform can include various components, such as a data lake component, an OLAP component, a OLTP component, and a unified data exchange. These components can work in harmony to provide efficient and secure data management.

Various embodiments include a computer-implemented method. The method can include executing a data lake application that includes computing instructions operable to perform operations including receiving raw data, cleansing the raw data using validation rules to generate curated raw data, and storing the curated raw data. The method also can include executing an OLAP application that includes computing instructions operable to perform operations including building a data layer comprising transaction objects from the curated raw data, storing the data layer in a data store, and performing batch processing using the data layer. The method additionally can include executing an OLTP application that includes computing instructions operable to perform operations including performing real-time processing based on data received from one or more of the curated raw data or the data layer. Communications to and from the data lake application, the OLAP application, and the OLTP application with other applications are processed through a unified data exchange.

A number of embodiments include a system including one or more processors and one or more non-transitory computer-readable media storing computing instructions that, when executed on the one or more processors, cause the one or more processors to perform various operations. The operations can include executing a data lake application that performs operations including receiving raw data, cleansing the raw data using validation rules to generate curated raw data, and storing the curated raw data. The operations also can include executing an OLAP application that performs operations including building a data layer comprising transaction objects from the curated raw data, storing the data layer in a data store, and performing batch processing using the data layer. The operations additionally can include executing an OLTP application that performs operations including performing real-time processing based on data received from one or more of the curated raw data or the data layer. Communications to and from the data lake application, the OLAP application, and the OLTP application with other applications are processed through a unified data exchange.

Some embodiments include one or more non-transitory computer-readable media storing computing instructions that, when executed on one or more processors, cause the one or more processors to perform various operations. The operations can include executing a data lake application that performs operations including receiving raw data, cleansing the raw data using validation rules to generate curated raw data, and storing the curated raw data. The operations also can include executing an OLAP application that performs operations including building a data layer comprising transaction objects from the curated raw data, storing the data layer in a data store, and performing batch processing using the data layer. The operations additionally can include executing an OLTP application that performs operations including performing real-time processing based on data received from one or more of the curated raw data or the data layer. Communications to and from the data lake application, the OLAP application, and the OLTP application with other applications are processed through a unified data exchange.

Figure 1:
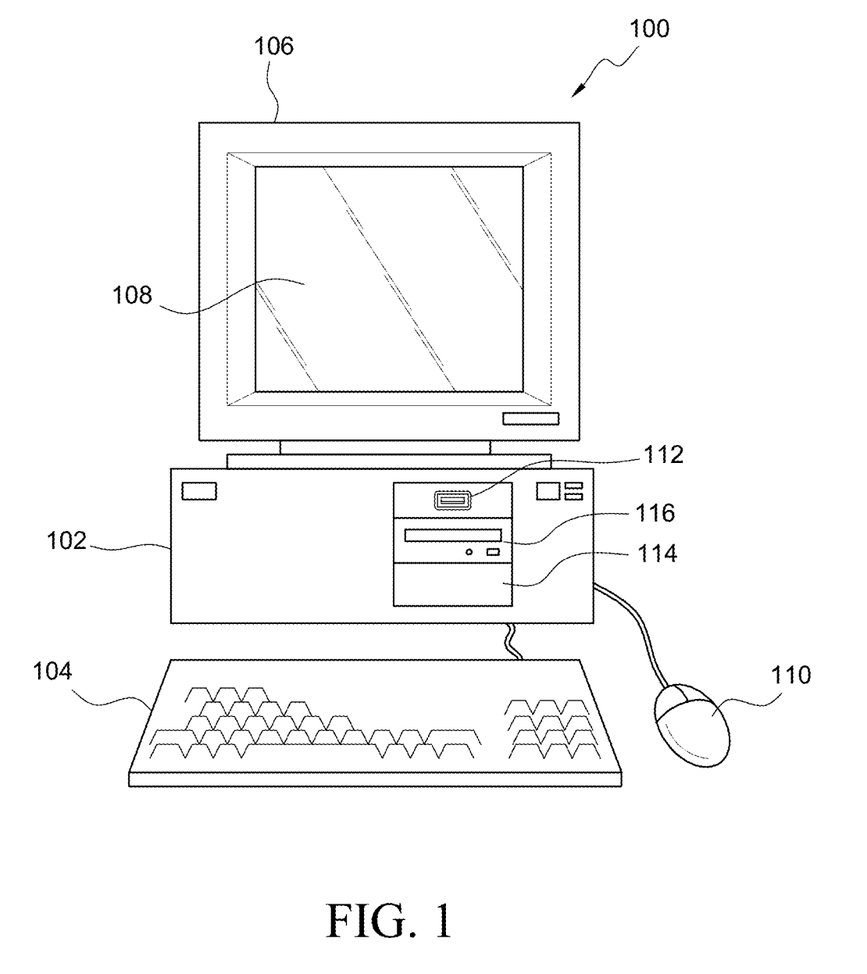
FIG. 1 illustrates a front elevational view of a computer system that is suitable for implementing an embodiment of the system disclosed in FIG. 3.
Figure 2:
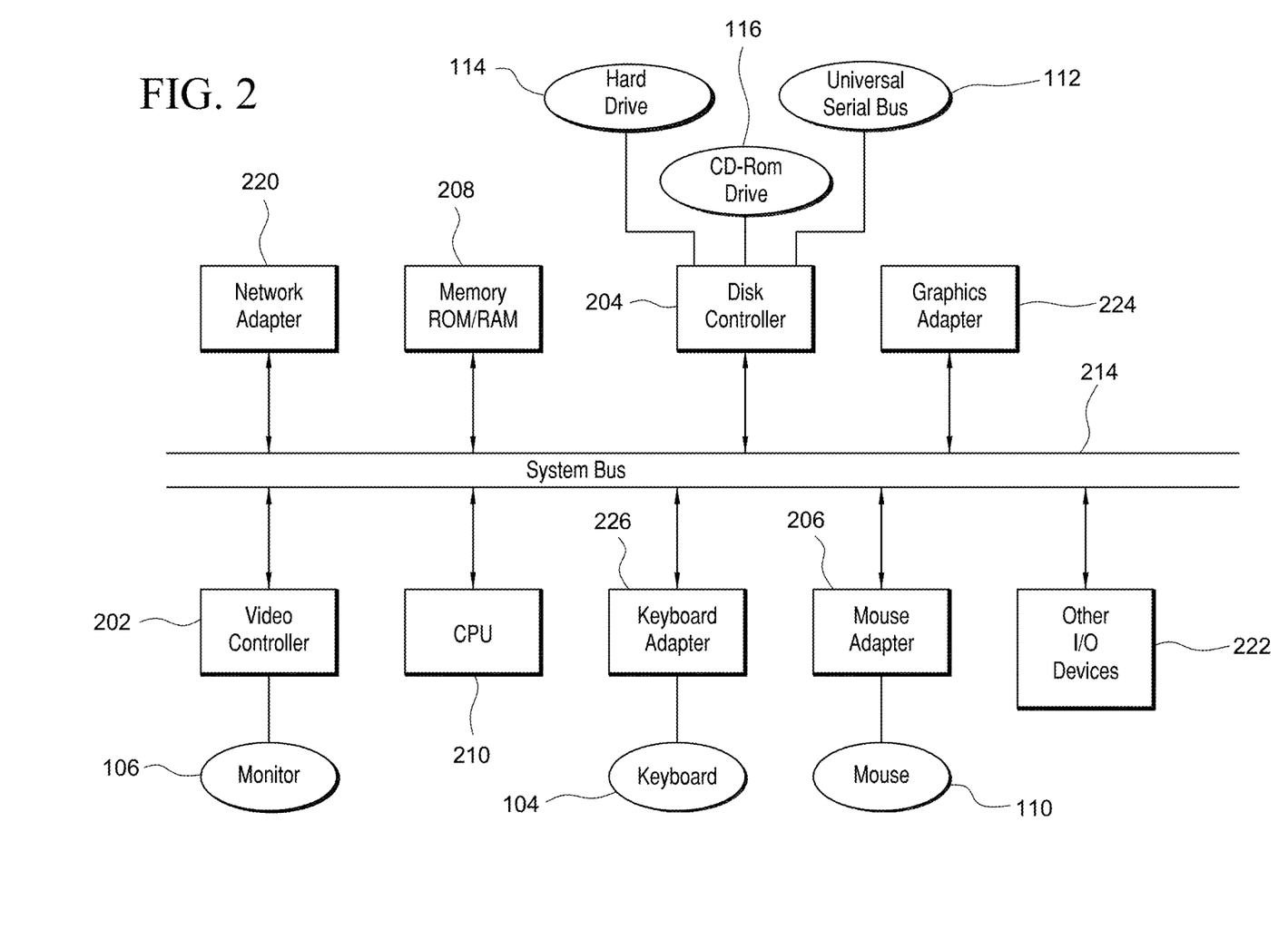
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or DVD, Blu-Ray, or other suitable media, such as media configured to be used in DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a DVD in DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general-purpose computer to a special purpose computer. For purposes of illustration, programs and other executable program components are shown herein as discrete systems, although it is understood that such programs and components may reside at various times in different storage components of computer system 100 and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
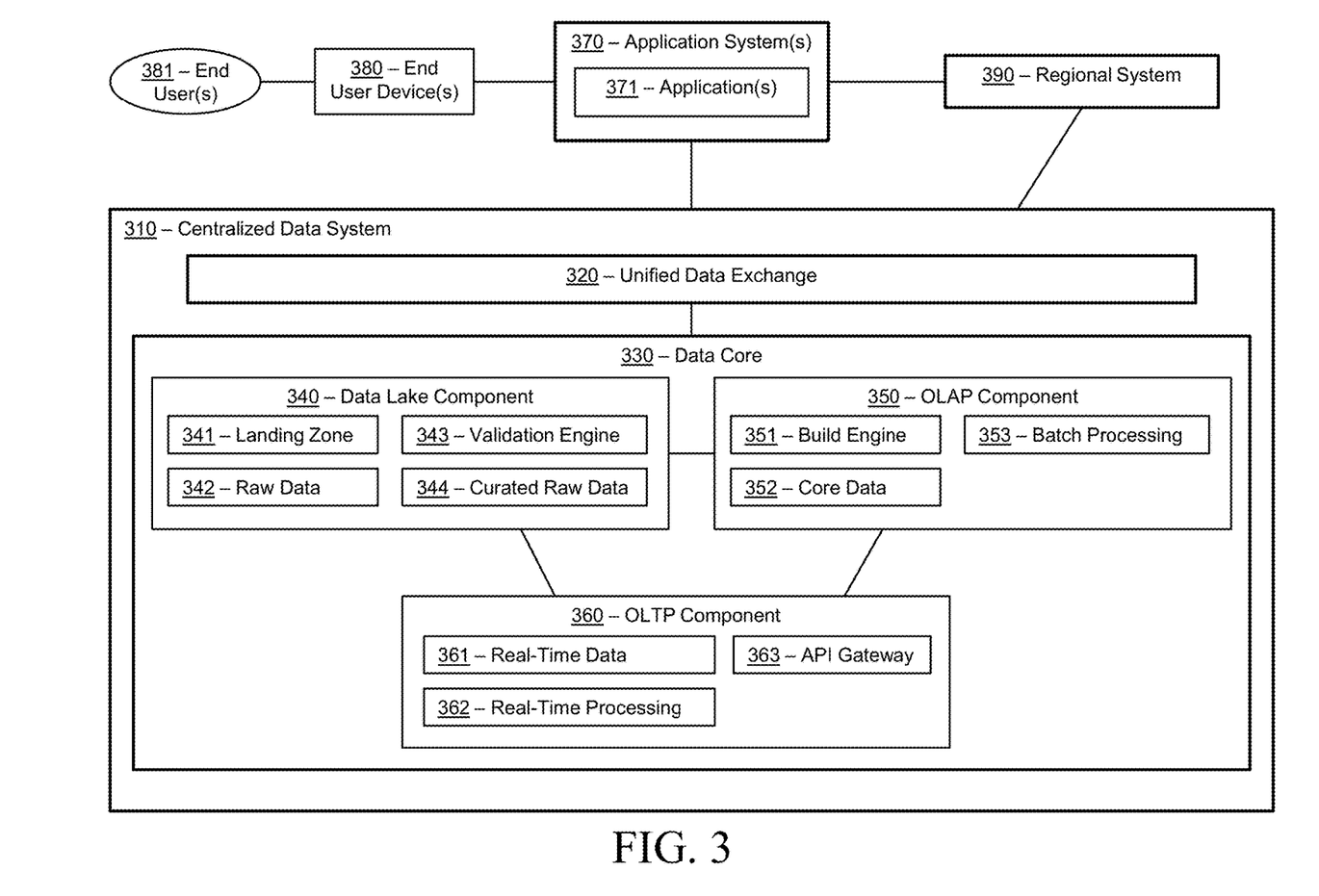
FIG. 3 illustrates a block diagram of a system that can be utilized for centralized data management across disparate applications, in accordance with an embodiment.

Turning ahead in the drawings, FIG. 3 illustrates a block diagram of a system 300 that can be utilized for centralized data management across disparate applications, in accordance with an embodiment. System 300 is illustrative in nature, and embodiments of the system are not confined to the configurations presented herein. The system can be employed in a many different embodiments or examples not specifically depicted or described in this document. In some embodiments, particular elements, modules, or components of system 300 can execute various procedures, processes, and/or activities. In other embodiments, these procedures, processes, and/or activities can be carried out by other appropriate elements, modules, or components of system 300. System 300 can include a centralized data system 310, a unified data exchange 320, and a data core 330, among other components. System 300 can be implemented using hardware and/or software, as detailed herein. In some embodiments, the hardware and/or software can be standard, while in other embodiments, the hardware and/or software can be tailored (e.g., optimized) for executing part or all of the functionalities of system 300 as described herein.

Centralized data system 310 can be in data communication with one or more applications 371 running on one or more application systems 370. In many embodiments, application 371 can be accessed by one or more end users 381 using one or more end user devices 380. In some embodiments, one or more regional systems 390 can be in data communication with centralized data system 310 and/or application systems 370. In many embodiments, a network (not shown), such as the Internet or another suitable network, can be used for communications between centralized data system 310, applications systems 370, end user devices 380, and/or regional system 390.

Centralized data system 310, applications systems 370, end user devices 380, and/or regional system 390 each be a computer system, such as computer system 100 (FIG. 1), as described above, and can be a single computer, a single server, or a cluster or collection of computers or servers, or a cloud of computers or servers. In another embodiment, a single computer system can multiple ones of centralized data system 310, applications systems 370, end user devices 380, and/or regional system 390.

In various embodiments, centralized data system 310 can be on-premises ("on-prem"), in the cloud, hosted on Saas (software as a service) systems, PaaS (platform as a service) systems, etc. For example, centralized data system can use Amazon Web Services (AWS), Microsoft Azure, etc. In many embodiments, centralized data system 310 is not tied to a particular solution or vendor, but can be used on any suitable system and/or can be extendible, such as through horizontal scaling.

End user devices 380 can be computer systems, such as computer system 100 (FIG. 1), as described above. In some embodiments, end user devices 380 can be desktop computers, laptop computers, mobile devices, and/or other endpoint devices used by one or more users (e.g., end users 381). A mobile device can refer to a portable electronic device with the capability to present audio and/or visual data (e.g., text, images, videos, music, etc.). For example, a mobile device can include at least one of a smartphone, a personal digital assistant, a handheld digital computer device (e.g., a tablet), a laptop computer device, a wearable user computer device, or another portable computer device with the capability to present audio and/or visual data. Thus, in many examples, a mobile device can include a volume and/or weight sufficiently small as to permit the device to be easily conveyable by hand.

Exemplary mobile devices can include (i) an iPhone®, iPad®, MacBook® or similar product by Apple Inc. of Cupertino, California, United States of America, and/or (ii) a Galaxy™ or similar product by the Samsung Group of Samsung Town, Seoul, South Korea. Further, in the same or different embodiments, a mobile device can include an electronic device configured to implement one or more of (i) the iOS® operating system by Apple Inc. of Cupertino, California, United States of America, or (ii) the Android™ operating system developed by the Open Handset Alliance.

In many embodiments, centralized data system 310, applications systems 370, and/or regional system 390 can each include one or more input devices (e.g., one or more keyboards, one or more pointing devices such as a computer mouse, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to centralized data system 310, applications systems 370, and/or regional system 390 in a wired manner and/or a wireless manner, and the coupling can be direct and/or indirect, as well as locally and/or remotely.

In many embodiments, applications 371 can be various disparate application, such as applications of an enterprise. For example, application can include point-of-sale (POS) systems, web systems, digital e-commerce applications, and/or other suitable applications.

In some embodiments, centralized data system 310 can include a unified data exchange 320 and a data core 330. The components of centralized data system 310 can be implemented as modules of computing instructions (e.g., software modules) stored on non-transitory computer-readable media that operate on one or more processors. Alternatively, or in addition, the components of centralized data system 310 can be implemented in hardware. The components of centralized data system 310 described herein are merely exemplary, and other suitable arrangements of components within system 300 are contemplated.

In many embodiments, centralized data system 310 can include various datastores that store data, as described below. In some embodiments, one or more of such datastores can include a structured (e.g., indexed) collection of data and can be managed by any suitable database management systems configured to define, create, query, organize, update, and manage database(s). Exemplary database management systems can include MySQL Database, PostgreSQL Database, Microsoft SQL Server Database, Oracle Database, SAP Database, and IBM DB2 Database.

Meanwhile, communications within centralized data system 310 and/or with the datastores can be implemented using any suitable manner of wired and/or wireless communication. Accordingly, centralized data system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless USB, Z-Wave, etc.; exemplary LAN and/or WAN protocol(s) can include Ethernet, WiFi, etc.; and exemplary wireless cellular network protocol(s) can include GSM, GPRS, CDMA, EV-DO, EDGE, UMTS, DECT, Digital AMPS, iDEN, HSPA+, LTE, WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, data core 330 can include a data lake component 340, an OLAP component 350, and an OLTP component 360. In many embodiments, data lake component 340, an OLAP component 350, and an OLTP component 360 can communicate with each other within data core 330, which in some embodiments can be provided by unified data exchange 320. Data lake component 340, OLAP component 350, and OLTP component 360 can be subsystems, applications, modules, etc., and can run on centralized data system 310. Centralized data system 310 can serve as a hub for data integration and management, facilitating the interaction between applications 371 and data core 330 through unified data exchange 320. In many embodiments, all communications between applications 371 can data core 330 can occur through unified data exchange 320. Unified data exchange 320 can provide a single integrated data exchange layer to send and receive data for the components of data core 330 (e.g., data lake component 340, OLAP component 350, and OLTP component 360).

In many embodiments, data lake component 340 can include a landing zone 341, raw data 342, a validation engine 343, curated raw data 344, and/or other suitable datastores and/or functional elements. In some embodiments, data lake component 340 can include additional datastores and/or functional elements found in a conventional data lake. Data lake component 340 can be responsible for the ingestion and storage of raw data 342, which may be received in landing zone 341. Landing zone can be an initial buffer, cache, or storage of data as it is received. The initial data received can be stored in raw data 342, which can be a datastore. Raw data 342 may be any type of data, such as data files from point-of-sale (POS) systems, web systems, or digital e-commerce platforms, and such data can be received in any format and/or at any frequency. In many embodiments, raw data 342 can undergo a cleansing process using a validation engine 343 to produce curated raw data 344.

In many embodiments, curated raw data 344 can still be in the same format as the raw data, in the form the data came in, but curated raw data 344 can be safe data that is in expected formats and has been cleared as not including security vulnerabilities. Curated raw data 344 can be stored in a datastore, such as a data lake. In many embodiments, the validation rules can be configured to determine whether raw data 342 satisfies data-type expectations and/or to detect security risks (e.g., SQL injections, DDOS (distributed denial of service) attacks, etc.) in raw data 342. In many embodiments, the validation rules do not enforce a data schema on write to centralized data system 310, which can allow for flexibility in the types of data that can be received. In many embodiments, centralized data system 310 can enforce a schema on read, but not on write, which is unlike conventional systems that enforce a schema on write. In many, raw data that is rejected can be stored in a rejected datastore (not shown). In some embodiments, data lake component 340 can be hosted in the cloud, on prem, using Apache Hadoop Distributed File System (HDFS), Amazon S3, Azure, etc., on any block storage, object store, and/or other suitable storage. There can be a loose coupling between raw data 342 and curated raw data 344.

In some embodiments, validation engine 343 can serve as a preliminary processing unit within the data lake component 340, equipped to apply a configurable set of system-level rules. These rules can be numerous and tailored to the specific requirements of different industries or applications. In many embodiments, validation engine 343 can provide for the integrity and security of raw data 342. Validation engine 343 can enforce rules that verify the type and structure of the data received, providing that such data matches the expectations set forth by the sending application. For example, if an application specifies that it will send integers and a string is received instead, validation engine 343 can reject the data as it does not conform to the data-type format expected. Similarly, if the volume of records received deviates substantially from the expected count, such as receiving 100 records instead of the specified 1000, or an excessive amount, such as 100 million records, which could indicate a DDOS attack, the validation engine 343 can reject such data. In many embodiments, validation engine 343 can includes a security layer that can detect and reject data containing unexpected elements, such as SQL statements, which could pose a security risk. This layer helps to prevent potential threats, such as SQL injection attacks, by providing that the data conforms to the expected content.

The rules applied by validation engine 343 can be industry-specific, with one set of rules for manufacturing that may include, for example, 300 rules, and another set for government applications that may encompass 2000 rules. These rules can be designed to be flexible and can be configured according to the data governance specifications of the particular domain.

In some embodiments, data received can be rejected in full or partially. For example, if the type of data to be received is specified as integer, and some strings and some integers are received, validation engine can reject the strings received while allowing the integers received. In some embodiments, when the amount of rejections exceeds a threshold amount of rejections (e.g., more than 15% rejected), then the data received can be rejected in full.

Once raw data 342 has been validated and cleansed, it can be stored in curated raw data 344, which can be organized into a tabular format consisting of rows and columns. At this stage, curated raw data 344 is able to be queried, allowing for data operations on curated raw data 344. However, in many embodiments, validation engine 343 does not apply any business logic or enforce a data schema. The application of business logic and schema is reserved for later processing performed by build engine 351 (described below), where the data undergoes further refinement and integration into the enterprise's data ecosystem.

In many embodiments, raw data 342 is stored for traceability, to keep a record of raw data 342 as it came in, but raw data 342 is generally not accessible by applications 371. When applications 371 ask for raw data, curated raw data 344 can be provided, as curated raw data meets the basic data governance and security specifications, as validated by validation engine 343. For example, data science applications often ask for raw data, but curated raw data 344 can be provided to avoid security vulnerabilities.

In many embodiments, OLAP component 350 can include a build engine 351, core data 352, batch processing 353, and/or other suitable datastores and/or functional elements. In some embodiments, OLAP component 350 can include additional datastores and/or functional elements found in a conventional OLAP system. OLAP component 350 can use build engine 351 to build data layer from the curated raw data 344. The data layer can be referred to as core data 352, which can be stored in a datastore. In many embodiments, core data 352 (also referred to as core data layer) can include transaction objects that shape the data according to rules that apply to various different transaction types.

In some embodiments, build engine 351 can perform a second stage of processing the data (after validation engine 343 performs a first stage of processing the data). Build engine 351 can process curated raw data 344. During this processing stage, build engine 351 can apply business logic, which can be governed by a set of rules, to transform curated raw data 344 into core data 352. The core data 352 can be the foundational layer where data is shaped and standardized into master data that is consistent across applications 371 within the enterprise.

In many embodiments, build engine 351 can process data from various sources and standardize it to form core data 352, such that core data 352 becomes the authoritative source of data for applications 371. This standardization is achieved by shaping the data into transaction objects that are stored in SQL tables within a massively parallel processing (MPP) environment. These transaction objects can be accompanied by metadata that tracks the provenance of the data, including when and what data was received.

For example, build engine 351 can determine that a particular data record about a transaction belongs to a specific customer type and transaction type. Consequently, the transaction object is structured in the data model to reflect the customer ID and transaction type. Similarly, contact points such as phone numbers, email addresses, and street addresses can be shaped into transaction objects that reflect the relationships between customers and their contact points. This could involve recognizing that a household email address is shared by multiple customers or that a single customer may have multiple email addresses. Build engine 351 can rank these contact points, based on a set of rules, to determine the priority of each contact point for a given customer.

The rules engine within build engine 351 can be extendible and capable of handling a diverse array of rules, which can be tailored for specific applications or multiple applications within the enterprise. This flexibility allows build engine 351 to process data into the particular types of objects that are relevant for core data 352.

The build process performed by build engine 351 constructs transaction objects from the curated raw data. The process can begin with build engine 351 analyzing the type of transaction that curated raw data 344 represents. Each transaction type may have associated with it one or more schema that define the structure and attributes of the transaction objects to be created.

Build engine 351 can utilize such schemas to interpret and organize the curated raw data into a structured format that aligns with the specifications of the transaction type. For instance, if the curated raw data includes sales transactions, build engine 351 can apply a sales transaction schema that specifies how to map the raw data fields to the corresponding fields of a sales transaction object, such as item identifiers, quantities, prices, and timestamps.

The schema may also include rules and logic for handling complex data transformations, data validation, and enrichment processes that are specific to the transaction type. This process can provide that the resulting transaction objects are complete, accurate, and ready for further processing, such as batch processing in the OLAP application or real-time processing in the OLTP application.

By leveraging the schema in this way, build engine 351 can systematically convert disparate and unstructured curated raw data into a uniform set of transaction objects that are optimized for subsequent analytical and operational uses within the system. This process is designed to be flexible and adaptable, allowing for the integration of new transaction types and corresponding schema as the data requirements for the enterprise evolve.

Once core data 352 is shaped and modeled, it can become accessible in a machine-readable format to any application 371 that requires it, facilitating batch processing and/or real-time access. Core data 352 enables reporting tools, analytical tools, and business applications to consume the data in their operations, leveraging the standardized and authoritative data provided by core data 352 for various analytical and operational purposes. Core data 352 can serve as a single source of truth for the data management of the enterprise, serving as the backbone for data-driven decision-making and operations.

In many embodiments, core data 352 can be stored in a datastore and used in batch processing 353. The batch processing can include various conventional types of processing performed by OLAP systems, such as analytical processing, query processing, etc., such as batch processing requested by applications 371. In some embodiments, query processing can occur by pulling the portion of the data from core data 352 into temporary data storage, spin up one or more temporary virtual warehouses to process the data, store the processed data, then spin down the virtual warehouses. In many embodiments, OLAP component 350 can be a MPP component to perform batch processing, such as ranking, merging records, consolidating data from multiple applications in compliant with various regulatory provisions, etc. In some embodiments, OLAP component 350 can be provided on-prem or in the cloud, and can used various OLAP frameworks, such as Snowflake, Redshift, Azure, etc.

In many embodiments, OLTP component 360 can include real-time data 361, real-time processing 362, API gateway 363, and/or other suitable datastores and/or functional elements. In some embodiments, OLTP component 360 can include additional datastores and/or functional elements found in a conventional OLTP system. OLTP component 360 can handle real-time processing 362 of data received from curated raw data 344 and/or core data 352, which can be stored in real-time data 361, and which can be based on API requests that are facilitated through an API gateway 363. In some embodiments, real-time data 361 can be synchronized with curated raw data 344 and/or core data 352. OLTP component 360, also referred to as the operational data store (ODS) in some contexts, can be a system designed to facilitate real-time data exchange and access to core data 352. OLTP component 360 can act as an API gateway, providing an interface for real-time interactions with core data 352. For example, in an application 371, a store lookup function can enable the querying of customer information in real-time based on specific criteria, such as a phone number and last name, which can be supported by OLTP component 360 to respond to the real-time data lookup request in real-time.

OLTP component 360 can provide the real-time processing within the data ecosystem of enterprise. OLTP component 360 can enable API integration with various applications 371 that utilize the data, allowing applications 371 to consume, harvest, and/or retrieve data in real-time. In some embodiments, real-time processing 362 of OLTP component 360 can include a stack of various services, such as AWS Lambda, Amazon SQS, Amazon EMR, and/or other suitable services for performing real-time processing.

In some embodiments, the API integration process within OLTP component 360 can involve various stages of data formatting and processing rules. Initially, there is an agreement on the API handshake logic, which can dictate the format of the data exchange. For example, if the agreed-upon format is JSON, any data received in the XML (Extensible Markup Language) format can be rejected. This handshake logic can provide consistency and reliability in the data exchange process. Following the handshake agreement, edge processing can be employed, which can allow for computation to be performed on the fly, such as calculations or data transformations that can occur in real-time as data is being accessed or transmitted through OLTP component 360. Additionally, OLTP component 360 can incorporate processing rules that perform regulatory compliance. For example, in adherence to the European Union's General Data Protection Regulation (GDPR), OLTP component 360 can facilitate the real-time deletion of customer data from the entire data platform in centralized data system 310. This capability is particularly valuable for maintaining compliance with data privacy laws and regulations that require the ability to quickly and effectively manage personal data.

In some embodiments, in the event of a component failure within data core 330, the architecture is designed with built-in redundancy to repopulate the failed component and continue to function. This repopulation of the failed component can provide reliability and resilience, allowing for continued operation without interrupting the overall data management operations. For instance, if OLTP component 360 experiences a failure, data core 330 can initiate a new process to repopulate the OLTP component 360 from the OLAP component 350. This process leverages the existing core data 352 within OLAP component 350 to restore the real-time data exchange capabilities of OLTP component 360.

If the OLAP component 350 encounters a failure, the system can recover by repopulating OLAP component 350 from data lake component 340. The data lake, which houses a vast repository of curated raw data 344, serves as a foundational layer from which OLAP component 350 can be reconstructed. In the unlikely scenario where data lake component 340 itself fails, the system is equipped to perform a reverse population from OLAP component 350. This reverse population process involves deconstructing the core data 352, using the metadata that accompanies core data 352, to deconsolidate transaction objects in core data 352 based on the metadata that indicates when and what elements of curated raw data 344 were used to create the transaction objects, thereby restoring the data lake's repository of curated raw data 344. The metadata associated with each data element records the origin of the data, detailing from which source of curated raw data 344 each piece of data was derived. In the process of repopulation, the system can deconsolidate transaction objects back into their constituent data elements based on this metadata. This granular level of data management can provide that, even in the face of component failures, the integrity and availability of the data are preserved, and the system can quickly return to its full operational capacity.

In many embodiments, unified data exchange 320 can be configured to manage communications to and from data lake component 340, OLAP component 350, and OLTP component 360 with other applications, allowing for the exchange of data in various forms and frequencies using a unified messaging system. For example, unified data exchange 320 may process batch integrations through the OLAP component 350 and real-time integrations through the OLTP component 360. In some embodiments, various messaging approaches can be used, such as managed file transfers, data record transaction messaging, enterprise service buses, etc., for data ingress and egress through unified data exchange 320.

In some embodiments, system 300 also can incorporate one or more regional systems, such as regional system 390, which can enable access to a subset of data stored in a regional data platform in accordance with applicable data laws, providing compliance with various regional data regulations. Regional system 390 can be a specialized adaptation of centralized data system 310 but designed to cater to the specific legal and regulatory requirements of a specific geographic location. Various regions may have distinct data privacy laws, particularly concerning personally identifiable information (PII). Accordingly, regional system 390 can use a tailored approach to data management in accordance with the regulatory requirements.

In many embodiments, regional system 390 can have the same or similar technical implementation as centralized data system 310, which can provide a consistent user experience and functionality. For example, regional system 390 can include components that are similar or identical to those components of centralized data system 310 (e.g., unified data exchange 320, data core 330, data lake component 340, OLAP component 350, OLTP component 360), but can be a specialized adaptation designed to cater to the specific legal and regulatory requirements of the specific geographic location. If regional system 390 is physically located within a specific geographic region, e.g., China, it can provide that data residency and sovereignty requirements are met. This localization allows regional system 390 to operate in compliance with the local data privacy laws, which may impose restrictions on the storage, processing, and transfer of PII. In many embodiments, the centralized data system 310 interacts with the regional system 390 in a manner that respects the boundaries of data accessibility as dictated by regional laws. For example, centralized data system 310 can access and process data from the regional system 390, but such data can be limited to the portion of data that is permissible under the local regulations. By incorporating regional systems (e.g., 390), the overall data management architecture can maintain a global perspective while providing for localized compliance. This approach can allow enterprises to operate across multiple jurisdictions without compromising on their commitment to adhere to the varying legal frameworks governing data privacy and protection in each region.

Figure 4:
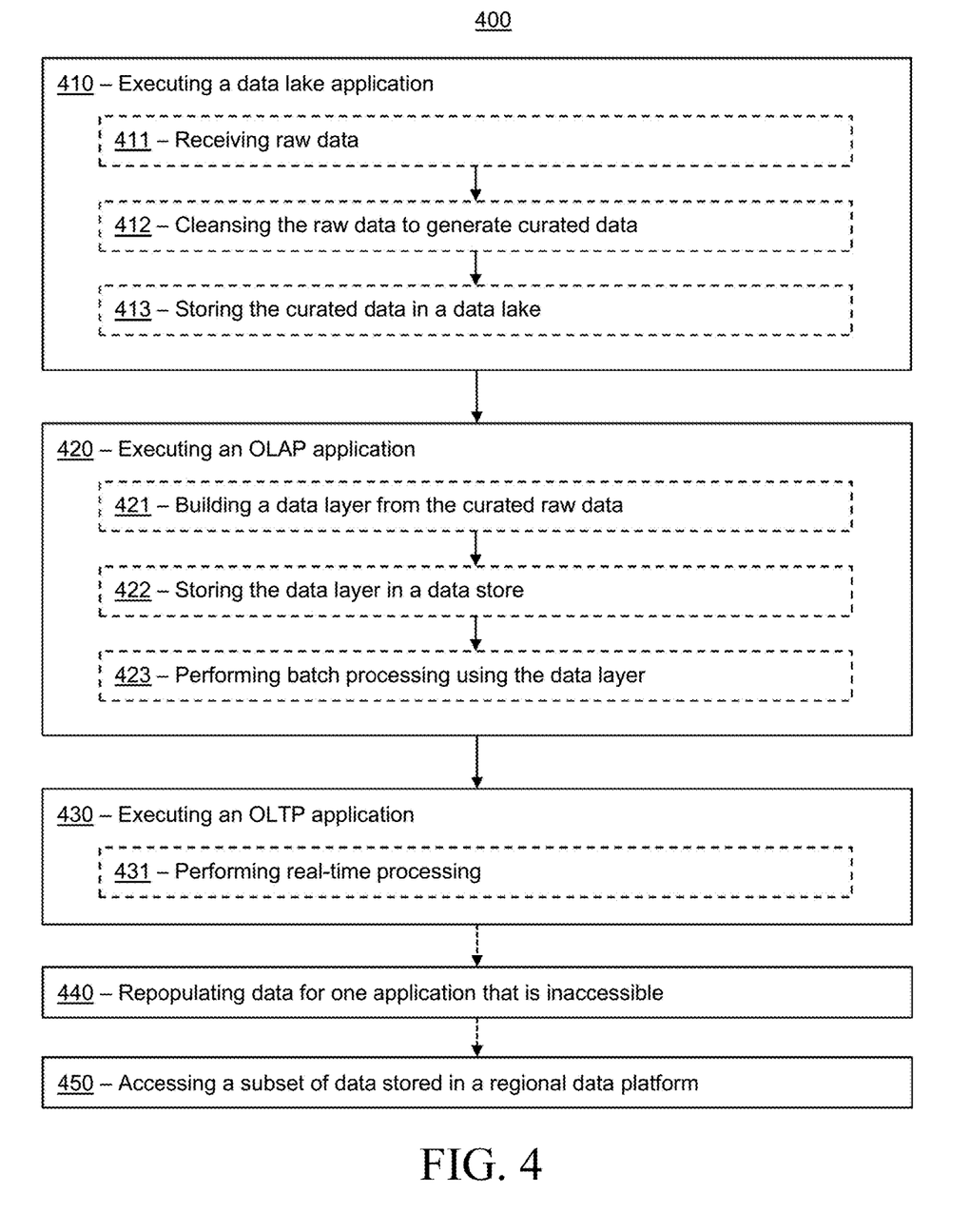
FIG. 4 illustrates a flowchart of a method for managing data within a centralized data platform for disparate applications.

Turning ahead in the drawings, FIG. 4 illustrates a flowchart of a method 400 for managing data within a centralized data platform for disparate applications. Method 400 is exemplary and is not limited to the embodiments presented herein. The method can be employed in a multitude of different embodiments or examples not specifically depicted or described in this disclosure. In some embodiments, the procedures, processes, and/or activities of method 400 can be executed in the sequence presented. In alternative embodiments, the procedures, processes, and/or activities of method 400 can be executed in another suitable order. In further embodiments, one or more of the procedures, processes, and/or activities of method 400 can be combined or omitted.

In various embodiments, system 300 (FIG. 3), centralized data system 310 (FIG. 3), and/or regional system 390 (FIG. 3) can be suitably configured to perform method 400 and/or one or more of the activities of method 400. In these or other embodiments, one or more of the activities of method 400 can be implemented as computing instructions configured to execute on one or more processors and stored on one or more non-transitory computer-readable media. Such non-transitory computer-readable media can be part of system 300 (FIG. 3). The processor(s) can be similar to or identical with the processor(s) described with respect to computer system 100 (FIG. 1).

Referring specifically to FIG. 4, method 400 can include an activity 410 of executing a data lake application. The data lake application can be similar or identical to the data lake component 340 (FIG. 3). The data lake application can include computing instructions operable to perform various operations related to the initial handling and storage of raw data.

In some embodiments, the operations of activity 410 can include an activity 411 of receiving raw data, which can be similar or identical to the data received at landing zone 341 (FIG. 3) and stored as raw data 342 (FIG. 3). This activity involves the initial ingestion of raw data from various sources into the system.

In some embodiments, the operations of activity 410 can include an activity 412 of cleansing the raw data using validation rules to generate curated raw data. This cleansing process can be similar or identical to utilizing the validation engine 343 (FIG. 3) to apply a set of predefined rules that provide for the quality and integrity of the raw data, resulting in curated raw data 344 (FIG. 3). The validation rules can include checks for data-type conformity, completeness, and security risk assessments, among others.

In some embodiments, the operations of activity 410 can include an activity 413 of storing the curated raw data. This storage process can be similar or identical to the retention of curated raw data 344 (FIG. 3) within a data lake or other suitable data storage system. The curated raw data is stored in a manner that preserves its integrity and makes it readily accessible for further processing.

In a number of embodiments, method 400 also can include an activity 420 of executing an OLAP application. The OLAP application can be similar or identical to the OLAP component 350 (FIG. 3). The OLAP application can include computing instructions operable to perform various operations related to the analysis and management of data.

In some embodiments, the operations of activity 420 can include an activity 421 of building a data layer comprising transaction objects from the curated raw data, which can be similar or identical to the process performed by build engine 351 (FIG. 3) using core data 352 (FIG. 3). This activity can involve transforming the curated raw data into structured transaction objects that are optimized for complex analytical queries, such as data science processing, among others.

In some embodiments, the operations of activity 420 can include an activity 422 of storing the data layer in a datastore. The datastore can be similar or identical to core data 352 (FIG. 3), which can provide a structured storage system designed to hold the data layer in a format that is accessible and efficient for analytical processing. This storage may be implemented using SQL tables or other suitable database structures that facilitate the retrieval and manipulation of the transaction objects.

In some embodiments, the operations of activity 420 can include an activity 423 of performing batch processing using the data layer. This batch processing can be similar or identical to batch processing 353 (FIG. 3), where the data layer is subjected to various batch operations such as aggregation, summarization, and analysis. The batch processing activity is designed to handle large volumes of data efficiently, allowing for the execution of complex analytical tasks that contribute to business intelligence and data-driven decision-making.

In several embodiments, method 400 additionally can include an activity 430 of executing an OLTP application. The OLTP application can be similar or identical to the OLTP component 360 (FIG. 3). The OLTP application can include computing instructions operable to perform various operations related to the real-time processing and management of transactional data.

In some embodiments, the operations of activity 430 can include an activity 431 of performing real-time processing based on data received from one or more of the curated raw data or the data layer. This real-time processing can be similar or identical to real-time processing 362 (FIG. 3), which may involve handling immediate data processing requests, such as those received through an API gateway 363 (FIG. 3). The real-time processing activity can enable the system to respond promptly to transactional operations, providing up-to-date information and facilitating immediate data transactions for business operations. This capability can be beneficial for applications (e.g., 371 (FIG. 3)) that require real-time data access and manipulation, such as e-commerce platforms, financial transactions, and other time-sensitive applications.

In some embodiments, method 400 further can include an activity 440 of repopulating data for one application based on data from the other applications when the data stored by one application is inaccessible. This repopulation process can provide for the continuity of data availability across the data lake application, the OLAP application, and the OLTP application. The repopulation activity can involve reconstructing missing or inaccessible data by leveraging data from one or more of the other components within the system, thereby providing that all applications (e.g., 371 (FIG. 3)) have access to the data they use for their operations. Activity 440 can be particularly useful in scenarios in which data integrity is compromised due to unforeseen circumstances, such as system failures or data corruption, and can help maintain the robustness and reliability of the centralized data system.

In some embodiments, method 400 additionally can include an activity 450 of accessing a subset of data stored in a regional data platform according to data laws applicable to the regional data platform. The regional data platform can be similar or identical to regional system 390 (FIG. 3), which can be configured to manage and process data in compliance with specific regional data protection and privacy laws. Activity 450 can involve selectively retrieving and processing data that is stored in a manner that adheres to local regulations, such as the General Data Protection Regulation (GDPR) in the European Union, the Personal Information Protection Law (PIPL) in China, and/or other suitable data privacy laws. Such regulations may include provisions on the handling of personal data, consent requirements, data subject rights, and the obligations of data processors and controllers, and in some cases may impose strict requirements for cross-border data transfers, with penalties for non-compliance. The regional data platform can provide that the system 300 (FIG. 3) remains compliant with various regional data regulations while still providing access to the data stored in the regional data platform. The activity can be particularly beneficial for multinational enterprises that use a data management system capable of operating across different legal jurisdictions without compromising on compliance requirements.

In many embodiments, the activities of method 400 can be performed by various components of system 300 (FIG. 3), and method 400 can be facilitated by a unified data exchange that processes communications to and from the data lake application, the OLAP application, and the OLTP application with other applications. Unified data exchange can be similar or identical to unified data exchange 320 (FIG. 3). This unified approach to data management enables efficient and compliant data operations across the enterprise.

In many embodiments, the techniques described herein can beneficially provide several technical advantages. The integration of disparate data management functions into a centralized data platform can greatly simplify the complexity of enterprise data handling. By consolidating the data lake, OLAP, and OLTP components into a single, unified system, enterprises can achieve a more streamlined and efficient data management process. This integration can lead to improved data consistency, reduced redundancy, and enhanced data integrity across various applications within an enterprise.

The techniques are novel in various aspects, including in the combination of the data lake, OLAP, and OLTP components within the same system, a convergence that is not found in conventional systems, where these functions are separated. This innovative integration allows for a single version of truth to be consolidated in the OLAP component, addressing the common issue of data discrepancies that arise when OLAP and OLTP components are operated as distinct systems. The presence of a single integrated data exchange layer that sends and receives data for the centralized data platform, interfacing with all three components—data lake, OLAP, and OLTP—is part of this novelty, as systems with separate functions use separate data exchange layers.

In such traditional systems, race conditions can occur due to the separation of these components, leading to potential conflicts and inconsistencies in data. By unifying these components, the system described herein mitigates such race conditions, which can provide that data remains consistent and reliable. Moreover, separate systems often skip validation steps or enforce a schema on write, potentially compromising data integrity and flexibility, but the techniques described herein can maintain a balance by performing validation without enforcing a rigid schema, thus preserving data flexibility while providing for quality.

The techniques can provide a loose coupling and integration designed to prevent collapse under high loads, which can provide that the system remains robust and resilient. This design approach can provide that data is secure, compliant with regulations, and readily accessible, catering to the diverse and evolving demands of modern enterprises. The model-agnostic and source-agnostic approach can allow for seamless integration with various data models and sources, making it a versatile solution for a wide range of industries.

In some embodiments, the techniques can be packaged as an integrated, licensable product. In many embodiments, the system is designed to be horizontally scalable, which can be a strategic choice to avoid high capital expenditures associated with vertical scalability. This horizontal scalability can be particularly beneficial when API calls to the OLTP component spike during times of high usage (e.g., during holidays or other times of high usage), in which the API calls can increase by multiples of 2, 5, 10, or more (e.g., 20-30 million API calls per day during peak times as opposed to average of 2 million API calls per day). These techniques described herein can provide the ability to handle such variability in load without compromising performance or data integrity.

In many embodiments, the components of the centralized data system (e.g., 310), such as the data lake, OLAP, and OLTP components, can seamlessly interact with each other through the unified data exchange. This interaction can enable real-time data processing and batch processing to occur concurrently without data conflicts, providing a robust solution for enterprises that require both analytical and transactional capabilities. The flexibility of the system to handle various data types and formats without enforcing a rigid data schema can allow for greater adaptability to different industry requirements and data sources.

Furthermore, the system's ability to repopulate data for inaccessible applications can provide for high availability and reliability of data, which can provide for business continuity and disaster recovery strategies. The regional system component can offer the advantage of compliance with regional data laws, such as the GDPR or PIPL, which is increasingly relevant in a globalized business environment with stringent data privacy regulations.

By leveraging metadata associated with the data layer, the system can facilitate efficient data tracking and lineage, enabling businesses to understand the provenance and evolution of their data. This can be particularly beneficial for auditing purposes and for maintaining transparency in data processing activities.

In many embodiments, the system and its components can enhance the performance, reliability, and scalability of data management in large-scale enterprise applications. The generalizability of these techniques can allow them to be applicable across diverse use cases and diverse applications.

Although the methods described above are with reference to the illustrated flowchart, it will be appreciated that many other ways of performing the activities associated with the method can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although the centralized data platform for disparate applications has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-4 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer-implemented method comprising:
   executing a data lake application comprising computing instructions operable to perform operations comprising:

receiving raw data;
cleansing the raw data using validation rules to generate curated raw unstructured data, wherein the validation rules are devoid of enforcing a data schema; and
storing the curated raw unstructured data;
executing an online analytical processing (OLAP) application comprising computing instructions operable to perform operations comprising:
building a data layer comprising transaction objects from the curated raw unstructured data;
storing the data layer in a data store; and
performing batch processing using the data layer; and
executing an online transaction processing (OLTP) application comprising computing instructions operable to perform operations comprising:
performing real-time processing based on data received from one or more of the curated raw unstructured data or the data layer,
wherein:
communications to and from the data lake application, the OLAP application, and the OLTP application with other applications are processed through a unified data exchange.

2. The computer-implemented method of claim 1, wherein the validation rules comprise determining whether the raw data satisfies data-type expectations and detecting security risks in the raw data.

3. The computer-implemented method of claim 1, wherein building the data layer from the curated raw unstructured data comprises enforcing one or more data schemas.

4. The computer-implemented method of claim 1, wherein the validations rules are configured to perform partial rejections the raw data when an amount of rejections is below a predetermined threshold.

5. The computer-implemented method of claim 1, wherein the curated raw unstructured data is stored in a tabular format.

6. The computer-implemented method of claim 1, wherein the transaction objects of the data layer are generated from the curated raw unstructured data using one or more schema based on transaction types for the curated raw unstructured data.

7. The computer-implemented method of claim 1, wherein the data layer is stored as Structure Query Language (SQL) tables.

8. The computer-implemented method of claim 1, wherein the real-time processing is performed based on Application Programming Interface (API) requests.

9. The computer-implemented method of claim 8, wherein the API requests are received after agreeing on an Application Programming Interface (API) handshake logic.

10. The computer-implemented method of claim 1 further comprising:
when data stored by one application of the data lake application, the OLAP application, or the OLTP application is inaccessible, repopulating the data for the one application based on two other applications of the data lake application, the OLAP application, or the OLTP application.

11. The computer-implemented method of claim 10, wherein repopulating the data comprises:
repopulating the data layer from the curated raw unstructured data.

12. The computer-implemented method of claim 10, wherein repopulating the data comprises:
deconsolidating the data layer to generate the curated raw unstructured data using metadata associated with the data layer.

13. The computer-implemented method of claim 12, wherein the metadata associated with the data layer indicates elements of the curated raw unstructured data that formed the transaction objects the data layer.

14. The computer-implemented method of claim 13, wherein the metadata associated with the data layer further indicates when each of the elements of the curated raw unstructured data were used to build the data layer.

15. The computer-implemented method of claim 1, wherein the OLTP application is configured to process a real-time data delete operation across the data lake application, the OLAP application, and the OLTP application.

16. The computer-implemented method of claim 15, wherein the real-time data delete operation comprises a customer deletion operation applicable across the data lake application, the OLAP application, and the OLTP application.

17. The computer-implemented method of claim 1 further comprising accessing a subset of data stored in a regional data platform according to data laws applicable to the regional data platform.

18. The computer-implemented method of claim 1, wherein the unified data exchange is configured to process communications to and from the data lake application, the OLAP application, and the OLTP application with the other applications in any form and with any frequency.

19. A system comprising one or more processors and one or more non-transitory computer-readable media storing computing instructions that, when executed on the one or more processors, cause the one or more processors to perform:
executing a data lake application to perform operations comprising:
receiving raw data;
cleansing the raw data using validation rules to generate curated raw unstructured data; and
storing the curated raw unstructured data;
executing an online analytical processing (OLAP) application to perform operations comprising:
building a data layer comprising transaction objects from the curated raw unstructured data;
storing the data layer in a data store; and
performing batch processing using the data layer; and
executing an online transaction processing (OLTP) application to perform operations comprising:
performing real-time processing based on data received from one or more of the curated raw unstructured data or the data layer,
wherein:
communications to and from the data lake application, the OLAP application, and the OLTP application with other applications are processed through a unified data exchange.

20. One or more non-transitory computer-readable media storing computing instructions that, when executed on one or more processors, cause the one or more processors to perform:
executing a data lake application comprising to perform operations comprising:
receiving raw data;
cleansing the raw data using validation rules to generate curated raw unstructured data; and
storing the curated raw unstructured data;

executing an online analytical processing (OLAP) application to perform operations comprising:
building a data layer comprising transaction objects from the curated raw unstructured data;
storing the data layer in a data store; and
performing batch processing using the data layer; and
executing an online transaction processing (OLTP) application to perform operations comprising:
performing real-time processing based on data received from one or more of the curated raw unstructured data or the data layer,
wherein:
communications to and from the data lake application, the OLAP application, and the OLTP application with other applications are processed through a unified data exchange.

* * * * *